May 19, 1970
I. J. KUGELMAN
3,512,641
COUNTERCURRENT SOLID-LIQUID CONTACTING SYSTEM
Filed Oct. 18, 1967
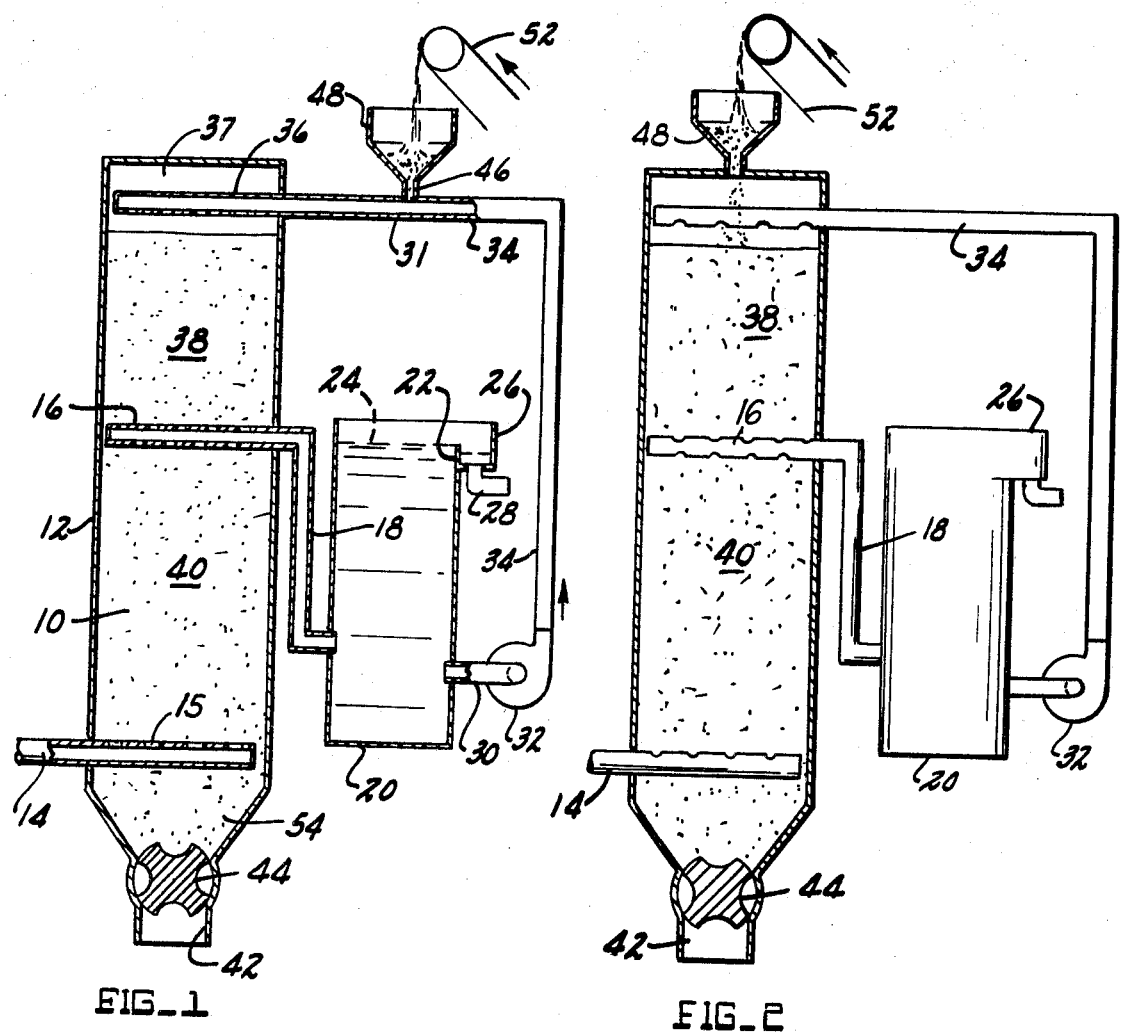
FIG_1
FIG_2
INVENTOR.
IRWIN J. KUGELMAN
BY
Jefferson Ehrlich
ATTORNEY United States Patent Office 3,512,641
Patented May 19, 1970

3,512,641
COUNTERCURRENT SOLID-LIQUID
CONTACTING SYSTEM
Irwin J. Kugelman, Plainfield, N.J., assignor to American Standard Inc., New York, N.Y., a corporation of Delaware
Filed Oct. 18, 1967, Ser. No. 676,192
Int. Cl. B01d 33/20
U.S. Cl. 210—80                 20 Claims

ABSTRACT OF THE DISCLOSURE

This invention relates to a method and apparatus for the treatment of a liquid by passing it upwardly through the lower portion of a confined bed of closely packed particles. The principal feature of the invention resides in the means and method of preventing fluidization of the bed particles and moving the bed countercurrent to the influent flow. This invention is specifically applicable to the treatment of various sewages in beds of granular material such as powdered coal; however, it is also applicable to other liquid solid contact processes.

CROSS-REFERENCES TO RELATED APPLICATIONS

Several other related patent applications are being filed concurrently or substantially concurrently herewith. Those applications are identified as follows: R. S. Bevans, Ser. No. 676,193, filed Oct. 18, 1967; R. S. Bevans, Ser. No. 676,266, filed Oct. 18, 1967; J. B. Hellmann, Ser. No. 676,180, filed Oct. 18, 1967; and I. J. Kugelman et al., Ser. No. 676,167 filed Oct. 18, 1967.

BACKGROUND OF THE INVENTION

The main objective of this invention is to provide a method and apparatus for the filtration of liquids containing a high concentration of suspended solids, such as raw or partially treated sewage and various trade wastes, in a bed of closely packed solid particles, such as powdered coal. Attempts to carry out the filtration of such liquids in stationary bed filters of closely packed solid particles which are conventionally used for the filtration of liquids containing a low concentration of suspended solids, have not heretofore met with success. Stationary bed filters must be periodically shut down and the beds cleansed of accumulated solids by backwashing, usually with a portion of the treated effluent produced during the filtration period. When the liquid to be treated is high in suspended solids, it has been found that these stationary filters clog very quickly. Thus, an excessive proportion of time must be spent on cleaning the filter. Furthermore, it has been found that when a liquid, such as sewage, containing sticky solids is filtered, it is difficult to efficiently clean the bed even with very frequent high flow rate backwash. Thus, even shorter periods of filtration time are available and a poorer effluent quality is obtained.

It is an object of this invention to move the filtration bed downward counter current to the liquid flow so that clogged layers of bed material are moved out of the bed while fresh bed material is added at the top. Thus, it is possible to maintain the system in operation continuously as no backwash of the bed is required.

In the upflow filtration systems which have been tried in the past, the flow rate of the liquid to be treated had to be kept below the fluidization velocity of the bed particles. If fluidization takes place, marked reduction of filtration efficiency results. It is an object of this invention to provide a means and method of preventing fluidization when the flow rate of the liquid to be treated is greater than the fluidization velocity of the bed particles. Thus it is possible to operate this upflow filtration system at any desired flow rate.

SUMMARY

This invention contemplates apparatus and a method for maintaining a filtration bed of granular particles, through which liquid is flowing upwardly, in a compact condition irrespective of the flow rate of the liquid to be filtered. In addition, apparatus and a method are provided to move the bed particles counter to the flow of the liquid to be treated. Compaction is accomplished by withdrawing upflowing liquid from the bed before it reaches the bed surface, and causing said withdrawn liquid to flow downward through the upper portion of the bed, thus applying a downward force to the bed in excess of that produced by the upflowing liquid. Downward movement of the bed is produced by removing a portion of the bed solids from the lower portion of the bed. The excess downward force provided by the recycle flow acts to drive the bed particles down and eventually out of the bed.

THE DRAWINGS

FIG. 1 is a vertical sectional view taken through an apparatus embodying the invention.

FIG. 2 is a vertical sectional view taken through a second apparatus embodying the invention.

GENERAL ARRANGEMENT

As shown in FIG. 1, raw liquid sewage is pumped through an inlet pipe 14 to a perforated pipe 15 in the lower portion of an upstanding treatment coal bed 10 which is contained in vessel 12. The liquid is caused to flow upwardly through the lower portion of the bed, thereby to be purified by filtration and adsorption processes. The liquid then flows through outlet pipe 16 to a sump or tank 20. Part of the filtered liquid is withdrawn through a discharge pipe 28, and part is recycled by a pump 32 into the closed space 37 above the coal bed in vessel 12. The recycled liquid flows downwardly through the upper bed portion 38 and exits through pipe 16 with the liquid coming upwardly from pipe 15 through the lower zone 40. The recycled liquid maintains the coal bed in a packed condition, thus preventing bed fluidization or uplift which would impair the filtration process.

Periodically or continuously the coal bed is replenished by adding new coal to the bed upper surface and removing spent coal from the bed lower surface. In FIG. 1, the new coal is added by introducing the new coal to the liquid being recycled by pump 32. In FIG. 2, the new coal is added by dumping it directly onto the bed upper surface. Removal of the spent coal may be accomplished through a ball valve 44.

FIG. 1 DETAIL

As illustratively shown in FIG. 1, the invention is embodied in a liquid filter bed 10 of coal, sand or other granular material, said bed being confined within an upstanding hollow columnar vessel 12 of a uniform horizontal circular cross section throughout the major portion of its length, but any other horizontal cross sectional shape, such as a square or rectangle may be employed also. Adjacent its lower portion, the columnar vessel is provided with a liquid inlet means, shown as a horizontal liquid influent pipe 14, having openings in a connecting pipe 15 spaced within vessel 12 for discharging liquid into the granular bed material 10. The bottom of vessel 12 is normally closed by valve 44 and the superjacent granular material. Therefore, the incoming liquid is caused to flow upwardly through zone 40 of the bed to a liquid outlet means, shown as a horizontal liquid collector pipe 16. A tubular screen (not shown) may be slipped over pipe 16 to prevent passage of coal or other granular material into the pipe.

During its upflow through treating zone 40, the liquid is purified by filtration and adsorption actions exerted by the coal particles. The liquid thus exits through pipe 16 in a purified state. Use of the perforated pipe-type inlet pipe 15 and the perforated pipe outlet 16 may be considered merely illustrative since various other methods and mechanisms may be employed for feeding the raw liquid and removing the treated liquid. For example, the raw liquid may be introduced to the bed via an upstanding pipe having a shielded upper end, as shown in U.S. Pat. 3,244,561. Alternately the liquid can be introduced and/or withdrawn through circumferentially spaced openings in the wall of vessel 12.

In the FIG. 1 apparatus, the outlet pipe 16 communicates with a liquid pipe 18 which feeds the treated liquid to a tank or vessel 20 having a weir-forming wall 22 located at about the same level as pipe 16. A normal liquid level 24 is thereby established, the overflow passing over the edge of weir 22 into a collection trough or chamber 26 having an outlet pipe 28. A second tank outlet communicates with a liquid line 30 leading to a conventional liquid pump 32. The outlet of pump 32 communicates with a liquid line 34 which terminates in a perforated pipe 36 arranged in the closed space 37 above bed 10.

During normal operation of the apparatus, pump 32 may be operated to continuously recycle a portion of the liquid in tank 20. The pumped liquid is discharged through pipe 36 to substantially fill the space above the bed and flow downwardly through the upper portion 38 of the bed. In the bed upper portion 38, the recycled liquid is continuously flowing downwardly toward pipe 16, while in the lower bed portion 40, liquid is continuously flowing upwardly from supply pipe 14 through pipe 15 toward pipe 16. The liquid flowing downwardly through bed portion 38 produces a downward drag force on the particles in the bed portion 38. This force is transmitted throughout the bed height by particle to particle contact, thus maintaining the particles in lower zone 40 in a compact condition. The downward directed drag forces are maintained in excess of the force introduced by the influent material so as to avoid fluidization of the bed material. The maintenance of downward drag forces in excess of the upward forces also permits exhausted bed material to be discharged from the bed at a point below supply pipe 14 and pipe 15.

BED REPLENISHMENT

During the operating service, the treatment capacity of the bed sections near inlet pipe 14 is reduced more rapidly than that of the bed material at any other section of the bed. For example, in the treatment of sanitary or industrial wastes, the granular medium at pipe 15 rather quickly becomes plugged with sewage solids. In the case of adsorption, extraction or ion exchange processes, the capacity of the particles adjacent inlet 14 would be diminished long before that of the bed material further up the column. In order to provide a substantially continuous process, with minimum use of bed material, the illustrated apparatus includes mechanism for replenishing the bed material as its treating usefulness decreases.

The desired replenishing operation is preferably accomplished by removing spent bed material from the bed lower surface. In the illustrated arrangements, the replenishing operation may be carried out during normal-run periods, although such replenishing operations could be performed during non-run periods. In the FIG. 1 and FIG. 2 structures, removal of spent material may be accomplished through an exit opening 42 equipped with a ball valve 44.

As shown in FIG. 1, new material may be added to the bed upper surface through an entrance opening 46 communicating with liquid line 34 adjacent a venturi 31. A granular material supply hopper 48 is schematically shown for admitting granular material to opening 46. During normal run periods, supply conveyor 52 may be operated to feed hopper 48 and entrance opening 46. Thus, the new material is introduced to the upper surface of the bed in the form of a slurry. While new material is being added, the ball valve 44 can be rotated to continuously transfer spent bed material from space 54 to a non-illustrated collection zone. The spent material may be disposed of by burial or incineration; conceivably it would be cleaned and/or regenerated for re-use in the bed.

In the FIG. 2 arrangement, the new coal is added by merely dumping same directly on the bed upper surface. The FIG. 1 arrangement may be the better method since the employment of a slurry may tend to promote wetting of the coal particles and better assimilation into the bed.

ADVANTAGEOUS FEATURES OF OPERATION

In the illustrated mechanism the recycled flow of liquid by pump 32 is very important to the proper operation. The function of this recycle flow is to produce a downward force on the bed in excess of the upward force produced by the liquid flowing from inlet 14 and through pipe 15 upwardly through zone 40. This downward force maintains the bed in a compact condition. Additionally, it assists in forcing the spent solids outwardly through the bottom of the column through ball valve 44.

Lack of the downward compaction force produced by pump 32 would tend to permit bed fluidization or bed uplifting, which would in turn reduce the efficiency of the bed material for filtration, adsorption, extraction, or ion exchange. Use of the downward compaction force may permit use of smaller mesh particles in the bed and/or higher liquid flow rates. Downflow of liquid through zone 38 also may have some advantageous action in polishing the recycled liquid. Thus, the liquid undergoes a first treating action as it flows upwardly from pipe 15 toward pipe 16, and a second treating or polishing action as it flows downwardly from pipe 36 through zone 38 toward pipe 16.

The depth of the bed, position of the outlet means 16, rate of recycling liquid by pump 32, ratio of recycled liquid to raw liquid inflow, and rate of discharge of spent granular bed material through valve 44 are variables which must be determined for each particular application. In general, the two methods of controlling the system are (1) controlling the recycle rate and (2) controlling the rate of discharge of spent granular material. Each of these control methods can be varied or adjusted independently of one another to operate the process most efficiently and/or to cope with marked fluctuations from design conditions.

Conventional liquid filtration systems are usually operated as non-steady state systems. The flow through the filter bed is stopped when the head loss is excessive, and the entire filter bed is cleaned or replaced. In virtually every situation only a small section of the depth of the filter bed is clogged when the head loss becomes excessive. Thus, only a small fraction of the bed depth is efficiently utilized before cleaning becomes necessary. In the illustrated apparatus continuous removal of the most clogged layers of bed material allows efficient utilization of the whole bed depth. The process can be run on a continuous or semicontinuous basis without any appreciable downtime.

In known upflow type filter bed arrangements, the clogging action adjacent the liquid inlet produces a pressure head loss which required a rather high liquid inlet pressure to produce sufficient liquid flow through the bed. The rather high supply pressure requirements tend to promote bed uplife or fluidization. In the present invention the use of bed material in zone 38 above the liquid outlet means 16, together with the recycling of liquid via pump 32, produces a downward force which maintains the bed in a relatively compact condition. This avoids bed fluidization or uplift, and the loss in treating action which accompanies such phenomena.

Conventional adsorption, extraction and ion exchange systems are known to take place more efficiently using compacted beds, countercurrent operation and relatively small size granular media. The present apparatus achieves all these conditions. It should be especially noted that the use of the recycling liquid and the upper bed section 38 has particular advantage when small size granular solids are used, since in the absence of these features, fluidization of small size granular beds will take place at very low upflow rates.

It will be appreciated that the description has necessarily centered on concrete embodiments of the invention, but that variations in construction and mode of operation can be resorted to without departing from the spirit of the invention as contemplated by the appended claims.

What is claimed is:

1. The method of treating a liquid comprising the steps of passing the liquid upwardly through the lower portion of a confined bed of solid closely-packed particles; withdrawing the liquid from the bed before it has reached the bed upper surface; and applying external pressure with at least a portion of the withdrawn liquid on that portion of the bed located above the liquid withdrawal point so that the pressure drop in the downward direction exceeds the pressure drop in the upward direction due to the rate of flow of the liquid, thereby to maintain the bed in a compacted condition.

2. The method of claim 1 wherein the step of applying pressure on the bed comprises pumping a portion of the liquid which has been withdrawn from the bed back into the bed at a point above the liquid withdrawal point.

3. The method of claim 1 wherein the step of applying pressure on the bed comprises the component steps of separating the liquid withdrawn from the bed into at least two fractions, and pumping one of the liquid fractions back into the bed at a point located above the liquid withdrawal point.

4. The method of claim 1 and further comprising the step of replenishing the bed material as its treating usefulnesses decreases; said replenishing step comprising the component steps of removing spent material from the bed lower surface, and adding new material to the bed upper surface.

5. The method of claim 4 wherein the step of adding new material to the bed comprises the component steps of pumping a portion of the liquid withdrawn from the bed back into a confined space above the bed upper surface, and introducing new bed material into the stream of liquid being pumped, whereby to promote wetting of the new material.

6. Liquid treating apparatus comprising a liquid treatment bed comprising a mass of particulated material; liquid inlet means operable to feed raw liquid into a lower portion of the bed; treated liquid outlet means located part way up the height of the bed, whereby the liquid flows from the inlet means upwardly through the bed and out of the bed before reaching the bed upper surface; and means for applying external pressure on that portion of the bed located above the liquid outlet means, said pressure exceeding the pressure of raw liquid fed through said liquid inlet means, thereby to maintain the bed in compacted condition; the pressure applying means comprising a liquid inlet arranged to receive liquid from the stream flowing out of the bed.

7. The apparatus of claim 6 wherein the pressure applying means includes a liquid pump.

8. The apparatus of claim 6 and further comprising a liquid accumulator tank arranged to receive the liquid discharged from the treating bed; said tank having separate first and second outlets for discharging treated liquid; said pressure applying means comprising a pump arranged to pump liquid from the second tank outlet back into the bed at a point located above the bed outlet means.

9. The apparatus of claim 6 and further comprising means for replenishing the bed material as its treating usefulness decreases; said replenishing means comprising an exit opening communicating with a lower portion of the bed for exhausting spent material from the bed lower surface, and entrance opening communicating with an upper portion of the bed for adding new material to the bed upper surface.

10. The apparatus of claim 9 wherein the pressure applying means comprises a liquid line, said line including a liquid pump having a pump inlet arranged to receive liquid from the stream flowing out of the bed, and a pump outlet arranged to direct liquid back into a confined space above the bed upper surface; said replenishing means having its new material entrance opening associated with the aforementioned liquid line, whereby the new bed material is introduced to the bed in the form of a slurry.

11. A filtration system comprising a bed of packed particles of matter, means for feeding the material to be filtered upwardly through said bed from a low-point therein, means for deriving filtered product from a region intermediate said low point and the top of the bed, means for feeding some of the filtered product to the top of said bed to maintain the bed in a compacted condition, and means associated with said feeding means to propel the particles of matter by venturi action.

12. The filtration system of claim 11 in which means are provided for releasing some of the bed material.

13. The filtration system of claim 12 which includes a valve through which the bed material is released.

14. The filtration system of claim 12 which includes means for replenishing the released material with other material.

15. A method of filtering material consisting of transmitting the material to be filtered upwardly through a bed of closely packed particles, deriving filtered product from an elevated point in the path of flow of said material well below the top of said bed, and feeding additional particles along with some of the filtered product, by venturi action, to the top of the bed to maintain the bed in a compacted condition.

16. A method according to claim 15 which also includes the step of releasing some of the bed material from a low point of said bed.

17. A method according to claim 16 which also includes the step of replenishing the released bed material with other bed material.

18. A method according to claim 17, in which the releasing step is followed by the replenishing step within a brief time interval so that the material in the bed will remain substantially constant in volume.

19. A method of filtering material which consists in moving the material to be filtered upwardly through the bed, feeding some of the filtered product derived from an intermediate point along the length of the bed to the top of the bed so that said filtered product will move downwardly toward the intermediate point, and receiving at the intermediate point and utilizing both the upflowing filtered product and the downflowing filtered product.

20. A method according to claim 19 which also includes removing some of the material and replenishing the removed bed material.

References Cited

UNITED STATES PATENTS

| | | | |
|---|---|---|---|
| 2,365,293 | 12/1944 | Robinson | 210—20 |
| 2,597,693 | 5/1952 | Wolcott | 210—189 X |
| 2,631,727 | 3/1953 | Cichelli | 210—189 X |
| 2,632,720 | 3/1953 | Perry | 210—19 X |
| 2,801,966 | 8/1957 | Mertes et al. | 210—268 X |
| 3,276,585 | 10/1966 | Kalinske | 210—279 X |
| 3,282,426 | 11/1966 | Entringer | 210—189 X |

JOHN W. ADEE, Primary Examiner

U.S. Cl. X.R.

210—196, 268, 269